United States Patent
Mitri et al.

(10) Patent No.: US 9,657,601 B2
(45) Date of Patent: May 23, 2017

(54) DEVICE AND METHOD FOR UTILIZING THE WASTE HEAT OF AN INTERNAL COMBUSTION ENGINE, IN PARTICULAR FOR UTILIZING THE WASTE HEAT OF A VEHICLE ENGINE

(71) Applicants: Mikhael Mitri, Nuremberg (DE); Alena Von Lavante, Duisburg (DE)

(72) Inventors: Mikhael Mitri, Nuremberg (DE); Alena Von Lavante, Duisburg (DE)

( * ) Notice: Subject to any disclaimer, the term of this patent is extended or adjusted under 35 U.S.C. 154(b) by 0 days.

(21) Appl. No.: 14/362,178

(22) PCT Filed: Nov. 30, 2012

(86) PCT No.: PCT/EP2012/004963
§ 371 (c)(1),
(2) Date: Jun. 2, 2014

(87) PCT Pub. No.: WO2013/079218
PCT Pub. Date: Jun. 6, 2013

(65) Prior Publication Data
US 2015/0033737 A1    Feb. 5, 2015

(30) Foreign Application Priority Data
Dec. 2, 2011    (DE) .......................... 10 2011 119 977

(51) Int. Cl.
*F01K 23/10*    (2006.01)
*F01K 13/00*    (2006.01)
(Continued)

(52) U.S. Cl.
CPC .............. *F01K 23/065* (2013.01); *F01K 7/32* (2013.01); *F01K 23/10* (2013.01); *F01K 25/06* (2013.01);
(Continued)

(58) Field of Classification Search
CPC ........ F01K 23/065; F01K 23/10; F01K 25/06; F01K 25/08; F01K 7/32; F01N 5/02; F02G 5/04; F02G 2260/00; Y02T 10/166
(Continued)

(56) References Cited

U.S. PATENT DOCUMENTS 2,964,910 A * 12/1960 Sonnefeld ............... F01K 19/02
                                                         60/653
3,376,706 A     4/1968 Angelino
(Continued)

FOREIGN PATENT DOCUMENTS

CN    106089337 A  * 11/2016
DE       3801605 C1 *  5/1989  ........... F01K 23/103
(Continued)

OTHER PUBLICATIONS

International Search Report from corresponding PCT Appln. No. PCT/EP2012/004963, dated Feb. 28, 2014.

*Primary Examiner* — Thai Ba Trieu
(74) *Attorney, Agent, or Firm* — Grossman, Tucker, Perreault & Pfleger, PLLC

(57) ABSTRACT

A method and a device for utilizing waste heat of an internal combustion engine, particularly for utilizing the waste heat of a vehicle engine, including at least one heat exchanger to transfer the waste heat from an internal combustion engine to a working medium; at least one turbine connected to a generator for generating mechanical or electrical energy, wherein said turbine is driven by said working medium; at least one cooler for cooling the working medium; at least one compressor for compressing the working medium; and at least one working medium circuit with pipes for the working medium, wherein the working medium, preferably carbon dioxide, propane, methanol or ethanol or a mixture of these fluids, is at least partially in a supercritical state.

16 Claims, 2 Drawing Sheets

(51) Int. Cl.
  *F01K 25/08* (2006.01)
  *F01K 7/34* (2006.01)
  *F01K 23/06* (2006.01)
  *F02G 5/04* (2006.01)
  *F01K 7/32* (2006.01)
  *F01K 25/06* (2006.01)
  *F01N 5/02* (2006.01)

(52) U.S. Cl.
  CPC .............. *F01K 25/08* (2013.01); *F01N 5/02* (2013.01); *F02G 5/04* (2013.01); *F02G 2260/00* (2013.01); *Y02E 20/16* (2013.01); *Y02T 10/166* (2013.01)

(58) Field of Classification Search
  USPC .................... 60/616, 618, 645, 651, 653
  See application file for complete search history.

(56) References Cited

U.S. PATENT DOCUMENTS

| | | | |
|---|---|---|---|
| 3,971,211 A | 7/1976 | Wethe et al. | |
| 4,765,143 A * | 8/1988 | Crawford et al. | 60/651 |
| 8,613,195 B2 * | 12/2013 | Held et al. | 60/645 |
| 8,616,001 B2 * | 12/2013 | Held et al. | 60/645 |
| 8,794,002 B2 * | 8/2014 | Held et al. | 60/651 |
| 8,813,497 B2 * | 8/2014 | Hart et al. | 60/645 |
| 8,857,186 B2 * | 10/2014 | Held | 60/655 |
| 8,966,901 B2 * | 3/2015 | Held et al. | 60/645 |
| 2009/0266075 A1 | 10/2009 | Westmeier et al. | |
| 2011/0072818 A1 | 3/2011 | Cook | |

FOREIGN PATENT DOCUMENTS

| | | | |
|---|---|---|---|
| DE | 10 2006 035 272 | 2/2008 | |
| DE | 10 2010 004 079 | 7/2011 | |
| EP | 0309267 A1 * | 3/1989 | ............ F01K 23/06 |
| EP | 0825398 A2 * | 2/1998 | ............ F25B 27/00 |
| EP | 2 410 153 | 1/2012 | |
| WO | 95/02115 | 1/1995 | |
| WO | 2010/126980 | 11/2010 | |
| WO | 2011/034984 | 3/2011 | |
| WO | 2011/066089 | 6/2011 | |

* cited by examiner

DEVICE AND METHOD FOR UTILIZING THE WASTE HEAT OF AN INTERNAL COMBUSTION ENGINE, IN PARTICULAR FOR UTILIZING THE WASTE HEAT OF A VEHICLE ENGINE

CROSS REFERENCE TO RELATED APPLICATIONS

This is the U.S. National Phase Application under 35 U.S.C. §371 of International Patent Application No. PCT/EP2012/004963 filed Nov. 30, 2012, which designated the United States and was published in a language other than English, which claims the benefit of German Patent Application No. 10 2011 119 977.6 filed on Dec. 2, 2011, both of which are incorporated by reference herein.

FIELD OF THE INVENTION

The invention relates to a device and a method for utilizing the waste heat of an internal combustion engine, in particular for utilizing the waste heat of a vehicle engine.

BACKGROUND

Modern internal combustion engines such as automotive engines, particularly diesel engines, have high efficiency and have approached the optimal Carnot efficiency, which describes the maximum theoretical efficiency of converting heat energy into mechanical energy. Future increases in efficiency are only to be expected in small quantities and are limited by the used materials and the ever-increasing emission standards. One possibility for the remaining increase in efficiency is the utilization of waste heat of an internal combustion engine, in particular the use of the waste heat from a vehicle engine, since for example in the case of a diesel engine the exhaust gas contains approximately 60% of the calorific value of combustion and in the case of a gasoline engine between 70% and 80% of the calorific value of combustion.

The use of waste heat to increase the efficiency of steam turbine is known, for example in a natural gas powered combined cycle power plant or in the waste gas turbines of large marine engines. The energy contained in the exhaust gas stream is used to heat a secondary heat engine. However, these secondary heat machines are very complex and cannot be used in a practical manner in vehicles due to the required size and the required weight of the heat exchangers for the evaporator and the cooler.

In internal combustion engines, in particular vehicle engines, it is also to be noted that only about 50% of the waste heat calorific energy escapes through the exhaust pipe and the remaining approximately 50% of waste heat is conveyed via the cooling power of the radiator in currently unusable temperatures of about 120° C. to 140° C.

SUMMARY

It is therefore object of the invention to provide a device and a method for utilizing the waste heat of an internal combustion engine, in particular for utilizing the waste heat from a vehicle engine, which is very compact, has low weight and is suitable of utilizing the energy contained in the exhaust stream at temperatures from 100° C., preferably 120° C. to 140° C.

This object is achieved by a device for utilizing the waste heat of an internal combustion engine, in particular for utilizing the waste heat of an automobile engine, comprising at least one heat exchanger for transferring waste heat of the internal combustion engine to a working medium; at least one turbine, connected to a generator, for generating mechanical or electrical energy, wherein the turbine is driven by the working medium; at least one cooler for cooling the working medium; at least one compressor to compress the working medium; and at least one working medium circuit with pipes for the working medium; which is characterized in that the working medium, preferably carbon dioxide, propane, methanol or ethanol or a mixture of these fluids, is at least partially in a supercritical state. The critical point of carbon dioxide is for example at 30.98° C. and 73.75 bar, above which carbon dioxide is in a supercritical state. According to the invention the working medium of carbon dioxide is held by the device at a temperature above 30.98° C. and is compressed by the compressor to at least 73.75 bar. For the other working media (propane, methanol, ethanol) or their mixtures, apply after the compressor corresponding temperatures and pressures above the critical point.

Preferably, the working medium is at least in the area between the compressor and the heat exchanger in a supercritical state, more preferably in the entire working medium circuit.

Due to the location of the critical point of the working medium, e.g. carbon dioxide, the device of the invention is capable of extracting useful work, even at the relatively low temperatures from the radiator cooling system of internal combustion engines with temperatures of 120° C. to 140° C.

For example, the density of carbon dioxide in its supercritical state is comparable to the density of water, but the viscosity of carbon dioxide in the supercritical state corresponds to the viscosity of a gas and the sonic velocity of the supercritical carbon dioxide is comparable with the sonic velocity of liquids. Due to the energy density of the supercritical carbon dioxide it is possible to build the device according to the invention extremely compact and integrate it in a vehicle. For example, the pipes for the working medium of the working medium circuit for a diesel engine having 103 HP and a calorific value of 200 kW energy contained in the exhaust gas stream would only have a diameter of 6 mm.

In contrast to a steam-driven secondary heat machine a secondary heat machine driven for example by a supercritical carbon dioxide is no longer dependent on a phase change of the working medium, thereby the turbine can be made considerably more compact.

By converting approximately 10% to 15% of the heat output of the internal combustion engine into mechanical power, for example, would lead to a reduction in fuel consumption of between 20% and 40%, depending on the motor type being used.

The device according to the invention can be used especially in hybrid cars, since the batteries of the electric drive can be loaded during the operation of the internal combustion engine of the hybrid vehicle or the electric drive can be operated at the same time.

According to a variant of the invention, the inventive device further comprises at least one recuperator, which transfers heat from one fluid to be cooled to a fluid to be heated, wherein the recuperator for examples cools the working medium after the at least one turbine and heats the working medium before the at least one heat exchanger. Thus, the recuperator increases the efficiency of the device according to the invention in such a way that it uses the residual heat contained in the working medium after the turbine to preheat the working medium before the heat exchanger, whereby the working medium in the heat exchanger is heated more.

In a variant of the invention, a heat exchanger is arranged in the region of the internal combustion engine, preferably in the coolant circuit/radiator circuit of the internal combustion engine, in particular directly downstream to the internal combustion engine. As stated above, the inventive device works due to the location of the critical point of the working medium, e.g. carbon dioxide, capable of converting the thermal energy contained in the coolant circuit of the internal combustion engine to useful mechanical work, even at the present temperatures of about 120° C. to 140° C.

According to a further variant of the inventive device a heat exchanger is arranged in the exhaust stream of the internal combustion engine, preferably immediately subsequent to the internal combustion engine. The heat exchanger is arranged for example within the exhaust pipe, preferably immediately subsequent to the internal combustion engine, since the exhaust gases of the internal combustion engine have the highest energy value at this location.

In an advantageous variant of the invention the device comprises a working medium circuit having at least two heat exchangers, wherein a heat exchanger, for example, is arranged in the area of the internal combustion engine and a heat exchanger is arranged in the area of the exhaust stream of the internal combustion engine. The working medium contained in the working medium circuit is thus heated by two heat exchangers to the highest possible temperature, thereby further increasing the efficiency of the device according to the invention.

According to a practical variant of the device according to the invention the pipes of the working medium circuit are arranged between the first heat exchanger and the second heat exchanger and afterwards to eventually following heat exchangers, between the last heat exchanger and the at least one turbine, between the at least one turbine and at least one cooler, between the at least one cooler and the at least one compressor and between the at least one compressor and the first heat exchanger. When using a recuperator it is arranged according to a variant of the invention in the working medium circuit between the at least one turbine and at least one cooler, and between the at least one compressor and the first heat exchanger for cooling the working medium between the at least one turbine and at least a cooler and heating of the working medium between the compressor and the at least one first heat exchanger.

In an alternative variant of the invention the inventive device comprises two working medium circuits, wherein in each working medium circuit a heat exchanger is arranged. For example, the first heat exchanger of the first working medium circuit is arranged in the region of the internal combustion engine and the second heat exchanger disposed in the second working medium circuit is arranged in the region of the exhaust stream of the internal combustion engine.

Preferably the two working medium circuits are fluidically separated from each other. According to a preferred variant a third heat exchanger is arranged between the first working medium circuit and the second working medium circuit, which transfers heat from the working medium of the first working medium circuit to the working medium of the second working medium circuit, wherein the third heat exchanger is configured such that the first and second working medium circuits are fluidly separated. This has the advantage that the first and the second working medium circuit can be operated at different levels of heat and the heat can be used by the hotter working medium circuit to heat the working medium of cooler the working medium circuit.

In a further variant a recuperator is arranged in the second working medium circuit between the at least one turbine and the third heat exchanger and between the at least one compressor and the second heat exchanger, in order to cool the working medium of the second working medium circuit between the at least one turbine and the third heat exchanger and to heat the working medium of the second working medium circuit between the at least one compressor and the second heat exchanger.

In a particularly advantageous variant the at least one heat exchanger of the first working medium circuit is arranged in the region of the internal combustion engine, preferably in the coolant circuit of the internal combustion engine, particularly directly after the internal combustion engine, and the at least one heat exchanger of the second working medium circuit is arranged in the area of the exhaust gas flow of the internal combustion engine, preferably immediately subsequent to the internal combustion engine.

The object is further achieved by a method for using the waste heat of an internal combustion engine, in particular for utilizing the waste heat of a vehicle engine, comprising the steps of heating a working medium by means of at least one heat exchanger, wherein the heat exchanger/s is/are preferably disposed in the range of the internal combustion engine and/or in the region the exhaust gas stream of the internal combustion engine; powering a turbine connected to a generator by means of the heated working medium to generate mechanical or electrical power; cooling of the working medium by means of a cooler; compressing the working medium by means of a compressor; wherein the working medium flows in a working medium circuit; characterized in that the working medium, preferably carbon dioxide, propane, methanol or ethanol or a mixture thereof, is at least partly in a supercritical state. For example, the working medium carbon dioxide is heated by the at least one heat exchanger to a temperature above 30.98° C. and compressed by the compressor to at least 73.75 bar, so that the carbon dioxide is in a supercritical state. The supercritical carbon dioxide has a high energy density, the viscosity of a flowing gas, wherein the density of the supercritical carbon dioxide is comparable to water. This allows it to build the components of a corresponding device extremely compact and integrate them into a vehicle. Furthermore, the position of the critical point at 30.98° C. allows the use of the waste heat of an internal combustion engine at low exit temperatures. Preferably, the working medium is at least in the area between the compressor and the heat exchanger in a supercritical state, more preferably in the entire working medium circuit.

In an advantageous variant the inventive method further comprises the step of transmitting a part of the residual heat of the working medium after the at least one turbine to the working medium before the at least one heating of the working medium by means of the at least one heating exchanger, for example by using at least one recuperator. By using the residual heat of the working medium after the at least one turbine to preheat the working medium before the least one heat exchanger the efficiency of the inventive method is further increased, as the working medium in the at least one heat exchanger can be heated more.

Advantageously the inventive method is carried out by means of a device described above. In the following the invention will be explained with reference to two embodiments shown in the figures.

DETAILED DESCRIPTION

Figure 1:
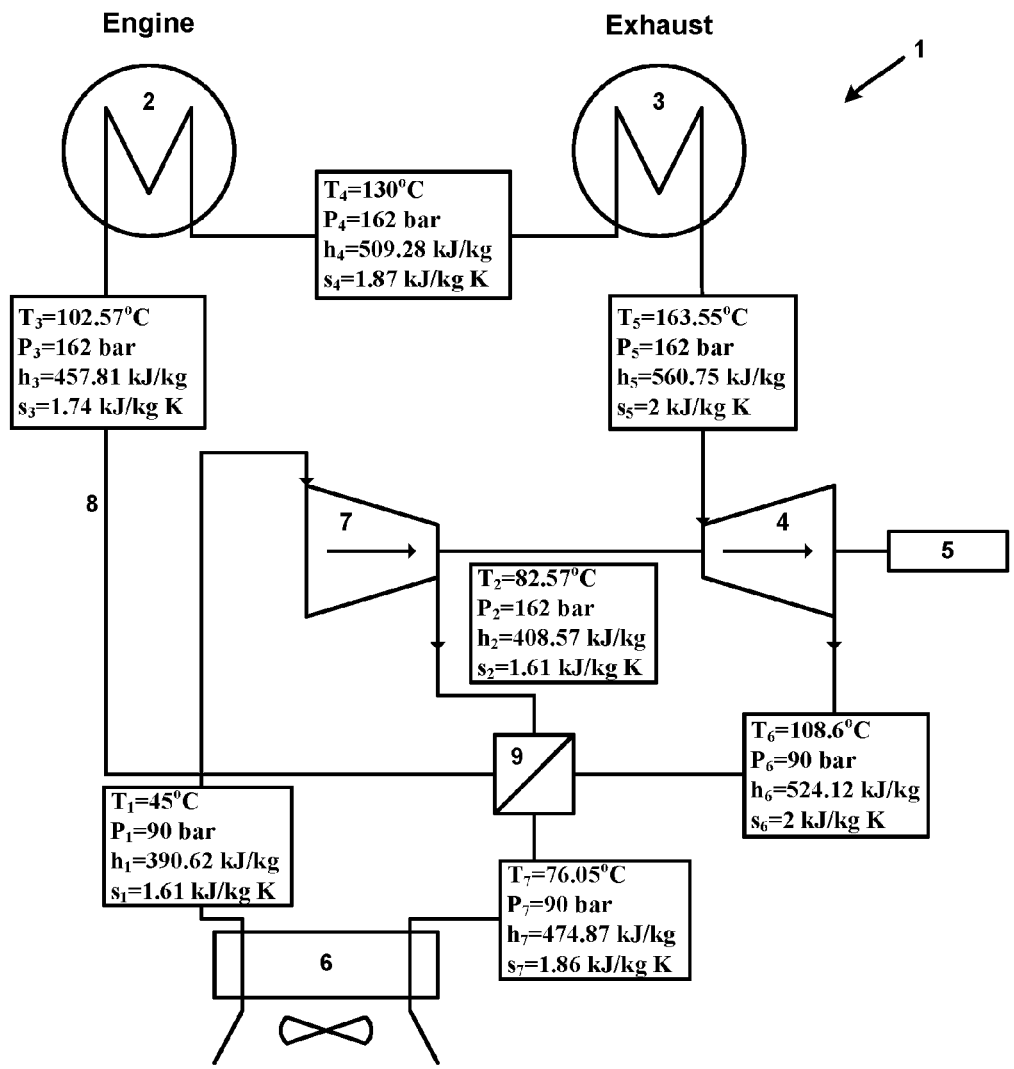
FIG. 1: a schematic view of a device according to the invention using a single working medium circuit.

FIG. 1 shows a schematic view of an inventive device 1 for utilizing the waste heat of an internal combustion engine, in particular for utilizing the waste heat of a vehicle engine. The device comprises a first heat exchanger 2 and a second heat exchanger 3, for transferring the waste heat from the internal combustion engine to a working medium. The first heat exchanger 2 is disposed in the range of the internal combustion engine, preferably in the coolant circuit of the internal combustion engine, in particular directly afterwards to the internal combustion engine. The second heat exchanger 3 is arranged in the region of the exhaust gas stream of the internal combustion engine, preferably immediately subsequent to the internal combustion engine.

The device 1 further comprises a generator 5 connected to a turbine 4 for generating mechanical or electrical energy, wherein the turbine 4 is driven by the working medium. The device 1 according to FIG. 1 further comprises a cooler 6 for cooling the working medium and a compressor 7 for compressing the working medium.

The aforementioned parts of the device 1 according to the invention are connected to each other by a working medium circuit 8 with pipes for the working medium.

The inventive device 1 is characterized in that the working medium, preferably carbon dioxide, propane, methanol or ethanol or a mixture thereof, is at least partially in a supercritical state. For example, carbon dioxide in a supercritical state has a high energy density, wherein the density of the supercritical carbon dioxide is comparable with the density of water, but with the viscosity of a gas. Furthermore, a heat engine driven by supercritical carbon dioxide is no longer dependent on a phase change, as is the case with secondary heat engines using steam-powered machines. The above mentioned properties of the supercritical carbon dioxide allow it to build the device 1 of the invention extremely compact and integrate it into a real car, for example the diameter of the pipes of the working medium circuit 8 for a 103-hp diesel engine with waste heat power of 200 kW are only 6 mm.

Preferably the working medium is at least in the area between the compressor 7 and the heat exchangers 2, 3, in a supercritical state, more preferably in the entire working medium circuit 8.

Furthermore, the use of a supercritical working medium has the advantage that even at relatively low temperatures of the heat flow of the engine the waste heat energy can be used. For example, the critical point of carbon dioxide is at 30.98° C. and 73.75 bar, whereby the heat energy of the internal combustion engine is available at relatively low temperatures of the heat flow of the internal combustion engine.

The device 1 according to FIG. 1 further comprises a recuperator 9 which transfers heat from one fluid stream to be cooled to a fluid flow to be heated. Recuperator 9 of FIG. 1 cools the working medium after the turbine 4 and the heats the working medium prior to the first heat exchanger 12. Thus, the residual heat of the working medium after the turbine 4 is used to heat the working medium prior to the first heat exchanger 2 be preheated, so that the working medium is heated more by the first heat exchanger 2.

The pipes of the working medium circuit 8 are disposed between the first heat exchanger 2 and the second heat exchanger 3, between the second heat exchanger 3 and the turbine 4, between the turbine 4 and the recuperator 9, between the recuperator 9 and the cooler 6, between the cooler 6 and the compressor 7, between the compressor 7 and the recuperator 9 and between the recuperator 9 and the first heat exchanger 2.

The device 1 according to FIG. 1 thus comprises a single working medium circuit 8. In the following the method of the invention for utilizing the waste heat of an internal combustion engine, in particular for utilizing the waste heat of a vehicle engine, will be explained with reference to the prevailing temperatures, pressures and enthalpies in the device 1 according to FIG. 1. The working medium in the working medium circuit 8 between the cooler 6 to the compressor 7 has a temperature of 45° C., is at a pressure of 90 bar, and has an enthalpy of 390.62 kJ/kg.

By the compressor 7 the working medium is compressed in the working medium circuit 8, whereby the temperature rises to 82.57 bar ° C. at a pressure of 162 bar, so that the enthalpy is 408.57 kJ/kg.

Subsequently, the working medium in the working medium circuit 8 is heated by the recuperator 9, so that the working medium between the recuperator 9 and the first heat exchanger 2 has a temperature of 102.57° C. at a pressure of 162 bar, whereby the enthalpy increases to 457.81 kJ/kg.

By the first heat exchanger 2 arranged in the region of the internal combustion engine, the working medium is heated in the working medium circuit 8 to 130° C. at 162 bar, which results in an enthalpy of 509.28 kJ/kg. Subsequently, the working medium is heated in the working medium circuit 8 through the second heat exchanger 3 arranged in the exhaust stream of the internal combustion engine to 163.55° C. at 162 bar, so that the enthalpy is equal to 560.75 kJ/kg.

After the second heat exchanger 3 the working medium is guided to the turbine 4 which is connected to the generator 5, for generating mechanical or electrical energy. After exiting turbine 4 the working medium has a temperature of 108° C. at a pressure of 90 bar, which results in an enthalpy of 524.12 kJ/kg.

The gas emerging from the turbine 4 is used by recuperator 9 to heat the working medium to between the compressor 7 and the first heat exchanger 2, whereby the working medium is cooled before the cooler 6. The recuperator 9 in this case has no fluid connection between the fluid stream to be cooled and the fluid flow to be heated. After exiting the recuperator 9 the cooled working medium has a temperature of 76.05° C. at 90 bar, and an enthalpy of 474.87 kJ/kg, and a specific heat capacity of 186 kJ (kg*K).

In a last step the working medium of the working medium circuit 8 is cooled by the cooler 6, wherein the working medium has a temperature of 45° C. at 90 bar at the outlet of the cooler 6, wherein the enthalpy equals to 390.62 kJ/kg. The cooled working medium of the working medium circuit 8 is again supplied to the compressor 7.

Figure 2:
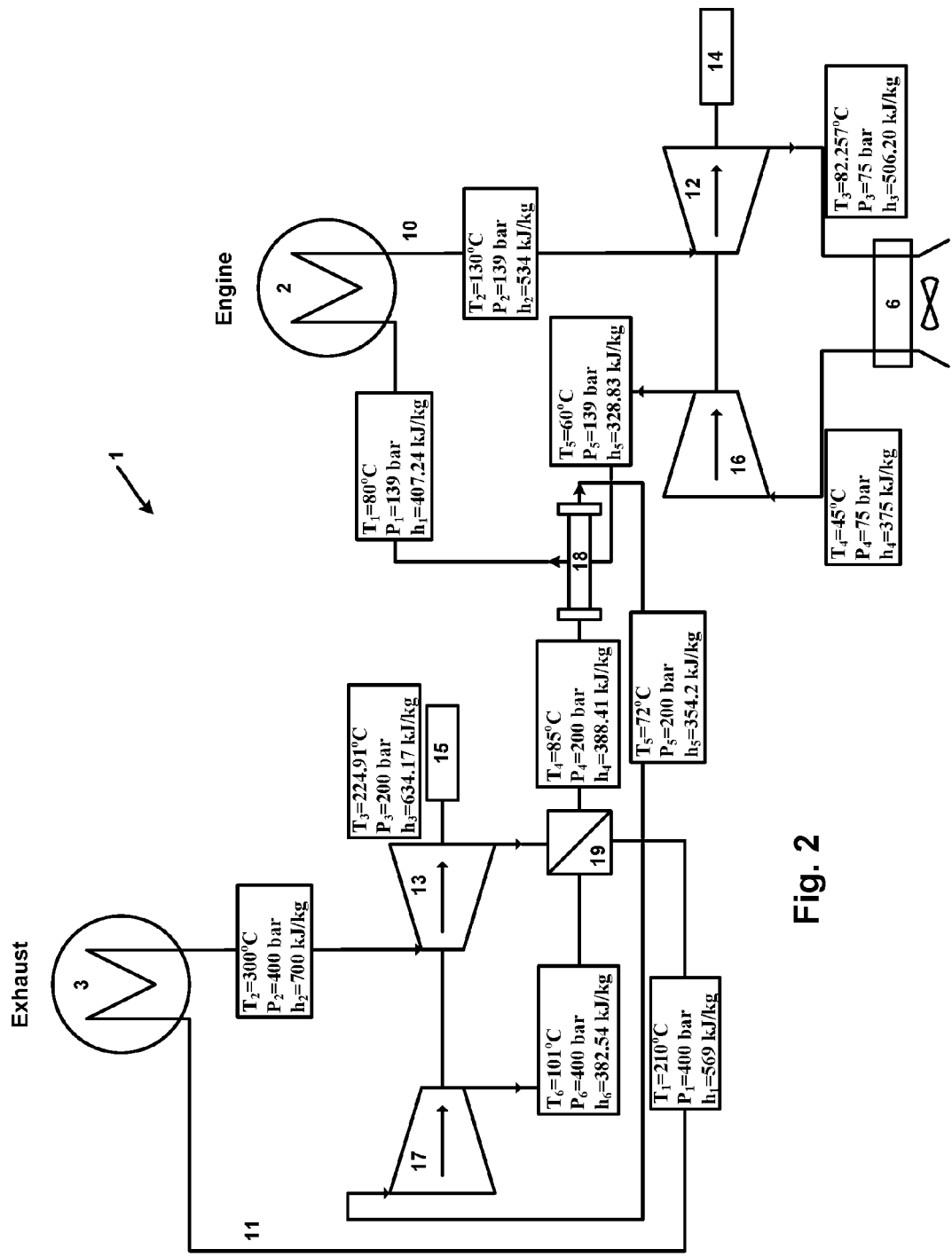
FIG. 2: a schematic view of a device according to the invention using two fluidic separated working medium circuits.

The inventive device 1 according to FIG. 2, in contrast to the device 1 of FIG. 1, comprises a first working medium circuit 10 and a second working medium circuit 11, wherein the two working medium circuits 10, 11 are fluidly separated from each other.

The first working medium circuit 10 includes a first heat exchanger 2, which is arranged in the region of the internal combustion engine, for example in the coolant circuit of the internal combustion engine, in particular directly after the internal combustion engine.

The first working medium circuit 10 of FIG. 2 further comprises a first generator 14 connected to a first turbine 12, a cooler 6 and a first compressor 16. The first turbine 14 connected to the first generator 12 is used for generating mechanical or electrical energy, wherein the first turbine 12 is driven by the working medium of the first working medium circuit 10. Subsequent to the first turbine 12 the working medium is cooled in the first working medium circuit 10 by means of cooler 6 and then compressed after the cooler 6 by the first compressor 16.

Between the first compressor 16 and first heat exchanger 2 a third heat exchanger 18 is arranged to heat the working medium in the first working medium circuit 10 between the first compressor 16 and the first heat exchanger 2.

The second working medium circuit 11 is fluidly separated from the first working medium circuit 10 and comprises a second heat exchanger 3 disposed in the exhaust stream of the internal combustion engine, preferably immediately subsequent to the internal combustion engine.

The second working medium circuit 11 further comprises a second turbine 13 connected to a second generator 15 for generating mechanical or electrical energy, wherein the second turbine 13 is driven by the second working medium in the working medium circuit 11.

The second working medium circuit 11 comprises subsequent to the second turbine 13 a recuperator 19, wherein the recuperator 19 cools the working medium in the second working medium circuit 11 subsequent to the second turbine 13 and heats the working medium between a second compressor 17 and the second heat exchanger 3. The working medium in the second working medium circuit cooled by means of the recuperator 19 is then supplied to the third heat exchanger 18, wherein the temperature of the working medium of the second working medium circuit is higher when it enters the third heat exchanger 18 than the temperature of the working medium in the first working medium circuit 10 within the region of the third heat exchanger 18. The working medium in the first working medium circuit 10 is thus pre-heated prior to the first heat exchanger 2 by the third heat exchanger 18 by means of the working medium in the second working medium circuit 11.

The working medium of the second working medium circuit 11 is supplied to the second compressor 17 after exiting the third heat exchanger 18, for compressing the working medium in the second working medium circuit 11.

The working medium exiting from the second compressor 17 of the working medium circuit 11 is pre-heated by the recuperator 19 and fed to the second heat exchanger 3.

Subsequently the operation of the inventive device 1 according to FIG. 2 is illustrated by the prevailing temperatures, pressures and enthalpies in the device. Before entering the first heat exchanger 2 the working medium of the first working medium circuit 10 has a temperature of 80° C., stands under a pressure of 139 bar and has an enthalpy of 407.24 kJ/kg. Through the first heat exchanger 2 the working medium is heated in the first working medium circuit 10 to 130° C., at a pressure of 139 bar, and has an enthalpy of 534 kJ/kg. The working medium heated by the first heat exchanger 2 drives the first turbine 12, which is connected to the first generator 14 to produce mechanical or electrical energy.

After exiting the first turbine 12, the working medium of the first working medium circuit has a temperature of 82.257° C., under a pressure of 75 bar, and has an enthalpy of 506.20 kJ/kg, which is subsequently cooled by the cooler 6 to a temperature of 45° C. at 75 bar, wherein the enthalpy is equal to 357 kJ/kg.

The thus cooled working medium of the first working medium circuit 10 is compressed by the first compressor 16, wherein the working medium of the first working medium circuit 10 has at the exit from the first compressor 16 a temperature of 60° C., under a pressure of 139 bar and has an enthalpy of 328.83 kJ/kg.

The working medium of the first working medium circuit 10 is subsequently heated by the third heat exchanger 18 to a temperature of 80° C. at 139 bar, and an enthalpy of 407.24 kJ/(kg*K), wherein the thus-heated working medium of the first working medium circuit 10 is again supplied to the first heat exchanger 2.

The working medium of the second working medium circuit 11 has, before entering the second heat exchanger 3, a temperature of 210° C., under a pressure of 400 bar, and has an enthalpy of 569 kJ/kg. The working medium of the second working medium circuit 11 is heated through the second heat exchanger 3 to 300° C. at 400 bar, so that the enthalpy rises to 700 kJ/(kg*K).

The working medium of the second working medium circuit 11 heated by the second heat exchanger 3 drives the second turbine 13 connected to the second generator 15, wherein the working medium of the second working medium circuit 11 has a temperature of 224, 91° C. at a pressure of 200 bar and a enthalpy of 634.17 kJ/kg when exiting the second turbine 13.

After exiting the second heat exchanger 13 the working medium of the second working medium circuit 11 is fed to the recuperator 19, thereby cooling the working medium of the second working medium circuit 11 to 85° C., at a pressure of 200 bar and a resulting enthalpy of 388.41 KJ/kg. After exiting the recuperator 19 the working medium of the second working medium circuit 11 is supplied to the third heat exchanger 18, which heats the working medium of the first working medium circuit 10 between the first compressor 16 and the first heat exchanger 2. Thereby the working medium of the second working medium circuit 11 is cooled by the third heat exchanger 18 to 72° C., at a pressure of 200 bar and an enthalpy of 354 kJ/kg.

The cooled working medium of the second working medium circuit 11 by means of the third heat exchanger 19 and the recuperator 18 is subsequently fed to the second compressor 17, which compresses the working medium of the second working medium circuit 11.

After exiting from the second compressor 17 the working medium of the second working medium circuit 11 has a temperature of 100° C., under a pressure of 400 bar and an enthalpy of 382.54 kJ/kg, and is supplied to the recuperator 19 for heating.

The recuperator 19 heats the working medium of the second working medium circuit 11 to 210° C., at a pressure of 400 bar and an enthalpy of 569 kJ/kg, wherein the working medium of the second working medium circuit 11 is supplied to the second heat exchanger 3 after being heated by the recuperator 19.

In the two previously described embodiments of the inventive device 1 the working medium is in a carbon dioxide in a supercritical state. This results from the fact that all over the inventive device the temperature and pressure are above the critical point of carbon dioxide, wherein the critical point of carbon dioxide is at 30.98° C. and 73.75 bar. From the use of carbon dioxide in a supercritical state, the aforementioned benefits are achieved, so that the inventive devices 1 may be formed so compact that it can be integrated into a vehicle. Alternatively, as the working medium propane, methanol or ethanol or mixtures thereof including carbon dioxide may be used, as long as the working medium is at least after the compressor in a supercritical state.

LIST OF REFERENCE NUMBERS 1 device
2 first heat exchanger
3 second heat exchanger
4 turbine
5 generator
6 cooler
7 compressor
8 working medium circuit
9 recuperator
10 first working medium circuit
11 second working medium circuit
12 first turbine
13 second turbine
14 first generator
15 second generator
16 first compressor
17 second compressor
18 recuperator
19 third heat exchanger

What is claimed is:

1. A system of utilizing waste heat of an internal combustion engine, comprising:
   a first heat exchanger and a second heat exchanger to transfer the waste heat from an internal combustion engine to a working medium;
   at least one turbine connected to a generator for generating mechanical or electrical energy, wherein said at least one turbine is driven by said working medium;
   at least one cooler for cooling the working medium;
   at least one compressor for compressing the working medium;
   a first working medium circuit with pipes for the working medium, wherein the working medium is at least one of carbon dioxide, propane, methanol, and ethanol, and wherein the working medium is in a supercritical state throughout an entirety of the first working medium circuit; and
   wherein said first heat exchanger is located in a coolant stream of the internal combustion engine and arranged in the coolant stream such that the waste heat from the internal combustion engine is transferrable from the coolant stream to the working medium via the first heat exchanger.

2. The system according to claim 1, further comprising at least one recuperator which transfers heat from a fluid flow to be cooled to a fluid flow to be heated, wherein the at least one recuperator cools the working medium after said at least one turbine and heats the working medium prior to said first heat exchanger and said second heat exchanger.

3. The system according to claim 1, wherein said second heat exchanger is located in an exhaust stream of the internal combustion engine.

4. The system according to claim 1, wherein two said first heat exchanger and said second heat exchanger are arranged in the first working medium circuit.

5. The system according to claim 4, wherein the pipes of the first working medium circuit are arranged between said first heat exchanger and said second heat exchanger; and
   afterwards to eventually following said first heat exchanger and said second heat exchanger,
   between said second heat exchanger and said at least one turbine,
   between said at least one turbine and said at least one cooler,
   between said at least one cooler and said at least one compressor, and
   between said at least one compressor and said first heat exchanger.

6. The system according to claim 5,
   wherein at least one recuperator is arranged in the first working medium circuit between said at least one turbine and said at least one cooler as well as between said at least one compressor and said at least one heat exchanger; and
   wherein the at least one recuperator cools the working medium between said at least one turbine and said at least one cooler and heats the working medium between the at least one compressor and the first heat exchanger.

7. The system according to claim 1, further comprising a second working medium circuit;
   wherein said first heat exchanger is arranged in said first working medium circuit; and
   wherein said second heat exchanger is arranged said second working medium circuit.

8. The system according to claim 7, wherein said first working medium circuit is fluidly separated from said second working medium circuit.

9. The system according to claim 7,
   wherein a third heat exchanger is arranged between said first working medium circuit and said second working medium circuit to transfer heat from the working medium of the second working medium circuit to the working medium of the first working medium circuit, and
   wherein said first working medium circuit is fluidly separated from said second working medium circuit are fluidly separated from each other within said third heat exchanger.

10. The system according to claim 9, wherein at least one recuperator is arranged in the second working medium circuit between said at least one turbine and said third heat exchanger and between said at least compressor and said second heat exchanger, to cool the working medium of the second medium circuit between said at least one turbine and the third heat exchanger and to heat the working medium of the second working medium circuit between said at least one compressor and said second heat exchanger.

11. The system according to claim 7,
    wherein said second heat exchanger of said second working medium circuit is located in an exhaust stream of the internal combustion engine.

12. A method of converting thermal energy into mechanical work by transferring waste heat of a vehicle engine to a working medium, comprising the steps of:
    heating said working medium with a first heat exchanger and a second heat exchanger, wherein said first heat exchanger is located in a coolant stream of the internal combustion engine and arranged in the coolant stream such that the waste heat from the internal combustion engine is transferred from the coolant stream to the working medium via the first heat exchanger;
    powering a turbine with said working medium being heated, wherein said turbine is connected to a generator to generate at least one of mechanical power and electrical power;
    cooling of the working medium by a cooler;

compressing the working medium by a compressor;
    wherein the working medium is at least one of carbon dioxide, propane, methanol and ethanol; and
    wherein the working medium flows in a supercritical state throughout an entirety of a first working medium circuit.

13. The method according to claim 12, further comprising the step of:
    transferring a part of residual heat of the working medium after said turbine to the working medium before heating the working medium by at least one of said first heat exchanger, said second heat exchanger and at least one recuperator.

14. The method according to claim 12, further comprising:
    transferring heat from a fluid flow to be cooled to a fluid flow to be heated via at least one recuperator:
    cooling the working medium after said turbine; and
    heating the working medium prior to said first heat exchanger and said second heat exchanger.

15. The method according to claim 12, further comprising:
    cooling the working medium between said turbine and said cooler by a recuperator; and
    heating the working medium between the at least one compressor and the first heat exchanger by said recuperator.

16. The method according to claim 12, further comprising:
    transferring heat from the working medium of said first working medium circuit to the working medium of a second working medium circuit with a third heat exchanger being arranged between said first working medium circuit and said second working medium circuit;
    wherein said first working medium circuit is fluidly separated from said second working medium circuit are fluidly separated from each other within said third heat exchanger;
    wherein said first working medium circuit includes said first heat exchanger; and
    wherein said second medium circuit includes said first heat exchanger.

* * * * *